No. 881,839. PATENTED MAR. 10, 1908.
G. O. APPEL.
AUTOMATIC FEEDING MECHANISM FOR THRESHING MACHINES.
APPLICATION FILED JUNE 14, 1907.
2 SHEETS—SHEET 2.
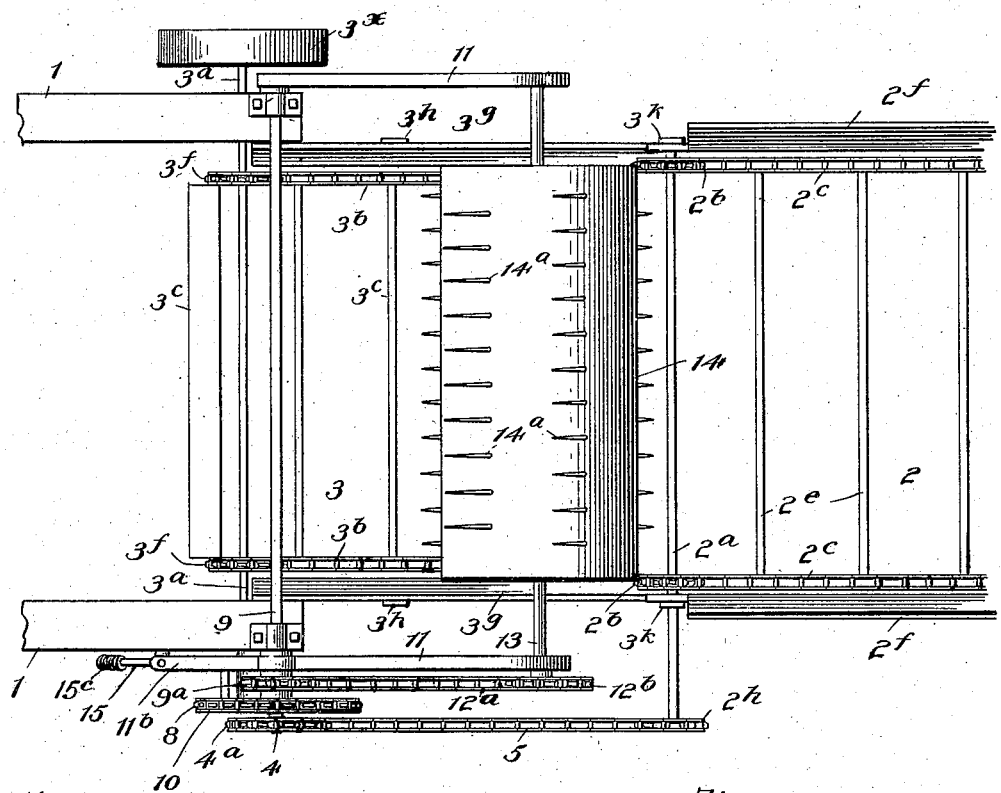
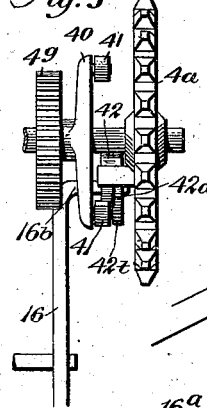
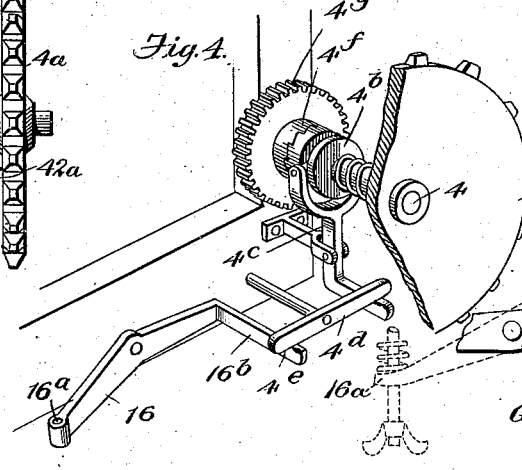
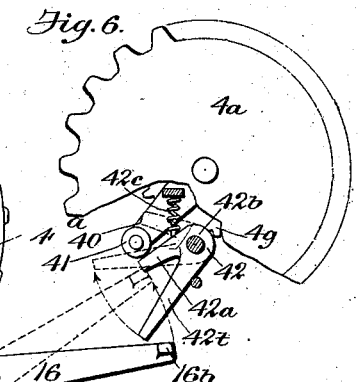
Inventor
George O. Appel.
Witnesses
Edwin L. Bradford
John T. Schrott
By Fred G. Dieterich
Attorneys.

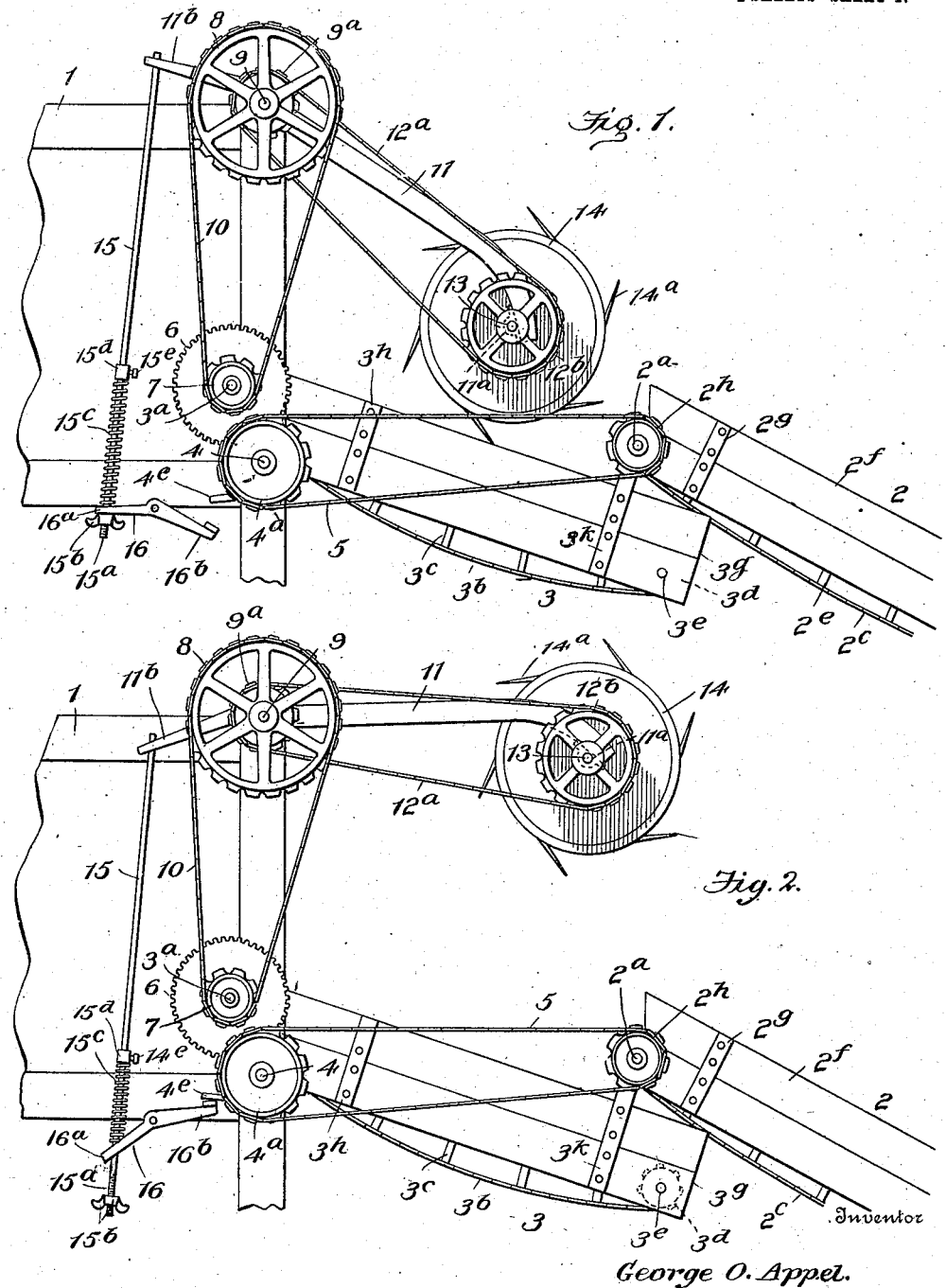

UNITED STATES PATENT OFFICE.

GEORGE O. APPEL, OF BUSHTON, KANSAS.

AUTOMATIC FEEDING MECHANISM FOR THRESHING-MACHINES.

No. 881,839.   Specification of Letters Patent.   Patented March 10, 1908.

Application filed June 14, 1907. Serial No. 379,053.

*To all whom it may concern:*

Be it known that I, GEORGE O. APPEL, residing at Bushton, in the county of Rice and State of Kansas, have invented certain new and useful Improvements in Automatic Feeding Mechanism for Threshing-Machines, of which the following is a specification.

My invention relates to certain new and useful improvements in rotary straw governors for self-feeders of threshing machines and the like and in its generic nature the invention embodies means for governing the quantity of straw fed to the threshing machine by the conveyers and means whereby the straw conveyers will be stopped should a surplus amount of grain come into engagement with the governor.

Primarily, my invention has for its object to provide a machine of the foregoing character which can be readily attached to the ordinary type of self-feeders for threshing machines, using a two-part conveyer and which can be easily and cheaply manufactured at a minimum expense.

In its more detail nature, the invention embodies certain novel features of construction, combination and arrangement of parts, all of which will be first described in detail and then be specifically pointed out in the appended claims, reference being had to the accompanying drawings in which,—

Figure 1, is a side elevation of a portion of a threshing machine and straw conveyers with my invention applied for use, showing the position of the parts when a normal quantity of straw is being fed to the machine. Fig. 2, is a similar view, showing the position of the parts when an abnormal quantity of straw is being fed to the machine. Fig. 3, is a top plan view of the invention in the position shown in Fig. 1. Fig. 4, is a detail section of the clutch devices and cut out mechanism for the feeding conveyer. Figs. 5 & 6, are detail views of a modified form of clutch mechanism.

Referring now to the accompanying drawings in which like letters and numerals of reference indicate like parts in all of the figures, 1 designates the threshing machine at its straw receiving end, which machine may be of any approved type and construction, as may also be the first and second conveyers 2 and 3, since the specific construction of the parts 1, 2 and 3, *per se*, form no part of my present invention. The second conveyer 3 is secured to project forwardly from the self-feeder in any suitable manner and has its drive shaft $3^a$ journaled in suitable bearings in the threshing machine.

The conveyer 3 includes an endless belt or sprocket chain $3^b$ having slats $3^c$ and passing around sprocket wheels $3^d$ on a shaft $3^e$ journaled in the outer end of the conveyer 3 and also around sprocket wheels $3^f$ on the shafts $3^a$ whereby the motion of the shafts $3^a$ will drive the endless conveyer $3^b$. The usual side-boards $3^g$ are also provided, as shown, and the boards are suitably braced as at $3^h$ and $3^k$.

Mounted in bearings in the bracket extension of the brace $3^k$ is a drive shaft $2^a$ of the first conveyer mechanism 2, and the drive shaft $2^a$ carries sprockets $2^b$ around which the conveyer chain $2^c$ passes, and the chain also passes around idler sprockets not shown at the bottom of the conveyer 2 and is slatted as at $2^e$ in a manner similar to the conveyer 3, the usual side-boards $2^f$ being likewise provided and braced as at $2^g$.

Mounted on the shaft $2^a$ is a drive sprocket $2^h$ around which and around a sprocket $4^a$, on a shaft 4 an endless drive belt 5 passes, the sprocket $4^a$ being rotatable with the shaft 4 on which a clutch member $4^b$ is splined to be susceptible of movement along the shaft, the clutch member $4^b$ being operatively controlled by the bell crank lever $4^c$, which is engaged by a second bell crank lever $4^d$, having a heel $4^e$, for a purpose presently to be explained. The clutch $4^b$ is adapted to clutch with a clutch face $4^f$ of a gear $4^g$ which rotates loosely on the shaft 4 and meshes with a master gear 6 mounted on the drive shaft $3^a$ to turn therewith. The shaft 4 is suitably journaled in the frame of the threshing machine. The drive shaft $3^a$ receives its power through a pulley $3^\times$ from some positively driven portion of the machine, (not shown).

7 designates a sprocket wheel on the drive shaft $3^a$ around which and around a sprocket 8 on a shaft 9 an endless chain 10 passes. The shaft 9 is mounted in suitable bearings on the machine 1 and acts as a fulcrum for the governor arms 11. The shaft 9 also carries a sprocket $9^a$ around which the governor cylinder drive chain $12^a$ passes, and the chain $12^a$ also passes around a sprocket $12^b$ on a shaft 13, mounted in bearings $11^a$ on the ends of the arms 11 and carrying the straw governing drum 14, as shown, the drum 14 being of cylindrical form, and provided with upwardly projecting spike members 14ᵃ, for a purpose presently explained.

The arms 11 have a rearwardly extending portion 11ᵇ to which the rod 15 is connected at one end and the rod 15 is threaded at 15ᵃ at its other end and passes through an aperture 16ᵃ in the bell crank lever 16 which has a foot 16ᵇ to engage the heel 4ᵉ of the bell crank lever 4ᵈ hereinbefore referred to. The rod 15 is governed with respect to the bell crank lever 16 by a wing-nut 15ᵇ, and a spring 15ᶜ which is secured in position by a collar 15ᵈ and set screw 15ᵉ as clearly shown in the drawings.

So far as described, the manner in which my invention operates is best explained as follows. The loose straw is placed on the conveyer 2 which delivers it onto the conveyer 3, from whence it is carried to the interior of the self-feeder in the usual manner. The drive shaft 4 operates the conveyer 2 through the medium of the chain 5 and its sprocket wheel connections, it being understood that the clutch 4ᵇ is normally held in engagement with the gear 4ᵍ by a spring 4ˣ, as shown, so that the shaft 4 imparts motion through the gear 6 and sprocket chain 10 and sprocket wheels that coöperate therewith, to the shaft 9 and from thence motion is conveyed to the shaft 13 to rotate the governing drum 14 in the same direction as the second conveyer 3, but at a slower rate of speed, it being understood that the second conveyer 3 is operated through the medium of the shaft 3ᵃ. As the straw is dumped on the second conveyer by the first conveyer 2, it causes the drum 14 to rise in proportion to the amount of straw dumped onto the conveyer 3, and should an excess amount of straw be dumped on the conveyer 3 by the conveyer 2, the drum 14 will rise to the position shown in Fig. 2 when the foot 16ᵇ of the bell crank lever 16 will engage the heel 14ᵉ of the clutch operating lever and throw the clutch out of gear, thus stopping the operation of the first conveyer No. 2, until the straw from the conveyer 3 has been delivered into the machine when the drum 14 drops to the position shown in Fig. 1 and the clutch is again thrown into a position to start the conveyer 2.

It will be seen that by the use of my invention, the grain or straw cannot be lodged against the governor drum since it is of cylindrical form, and further the rotation of the drum at a slower speed than the movement of the conveyer and in the same direction therewith causes the straw to be evened out and leveled up on the carrier or conveyer.

When it is desired to feed a greater amount of straw to the threshing machine, the wing-nut 15ᵇ is accordingly adjusted to hold the foot 16ᵇ of the bell crank lever 16 from engaging the heel 14ᵉ of the clutch operating lever until the rotary operating cylinder 14 has reached the desired distance above the conveyer 3, as will be well understood by reference to the drawings.

Instead of using the clutch mechanism shown in detail in Fig. 4, I may use a trip clutch shown in detail in Figs. 5 and 6, by reference to which it will be seen that the gear 4ᵍ carries arms 40 which have friction rollers 41 to engage the heel 42ᵃ of the bell crank trip lever 42, which is fulcrumed at 42ᵇ to the sprocket wheel 4ᵃ, and is spring pressed to its normal position, shown in Fig. 6, by a spring 42ᵃ. The long arm 42ᵗ of the bell crank trip lever 42 is adapted to be directly engaged by the lateral extension 16ᵇ of the member 16. The operation of this clutch member is similar to that shown in Fig. 4, with the exception that when the member 16 is rocked it will move the bell crank lever 42 to disengage its heel frame the arms 40 and permit the gear 4ᵍ turning without turning the sprocket 4ᵃ, it being understood that so long as the member 16 has its portion 16ᵇ in alinement with the path of rotation of the trip lever 42, the same will be tripped during each revolution to keep it disengaged from the arms 40, but when the member 16 has its portion 16ᵇ out of engagement with the path of rotation of the trip lever 42, then the trip lever 42 and the arms 40 are in engagement with one another so that the sprocket 4ᵃ will rotate with the gear 4ᵍ.

From the foregoing description taken in connection with the accompanying drawings, it is thought the complete construction, operation and advantages of my invention will be readily understood by those skilled in the art to which the invention appertains.

What I claim is.

1. In a machine of the class described, the combination with a self-feeder for threshing machines, including a first and second elevating conveyer, a main drive shaft for said second conveyer, a conveyer drive shaft for said first conveyer, a supplemental shaft, sprocket and chain connections between said supplemental shaft and said first conveyer drive shaft, gear connections between the main drive shaft and said supplemental shaft, a clutch mechanism coöperating with said gear connections, a rotatable straw governing drum coöperatively connected with said main drive shaft, and means controlled by the movement of said drum for throwing said clutch mechanism out of operative connection at times, substantially as shown and described.

2. In a machine of the class described, the combination with a self-feeder for threshing machines, including a first and second elevating conveyer, a main drive shaft for said second conveyer, a conveyer drive shaft for said first conveyer, a supplemental shaft, sprocket and chain connections between said supplemental shaft and said first conveyer drive shaft, gear connections between the main drive shaft and said supplemental shaft, a clutch mechanism coöperating with said gear connections, a rotatable straw governing drum coöperatively connected with said main drive shaft to rotate at a speed less than that of the second elevating conveyer, means controlled by the movement of said drum for throwing said clutch mechanism out of operative connection at times, and means for normally holding said clutch mechanism in operative connection substantially as shown and described.

3. A device of the class described, comprising in combination with a self-feeder for threshing machines, including a first and second conveyer, a main drive shaft, means for driving said second conveyer from said main drive shaft, a supplemental shaft, means for driving said first conveyer from said supplemental shaft, gear connections between said main drive shaft and said supplemental shaft, said gear connections including a loose pinion on the supplemental drive shaft and a rotatable fixed pinion on the main drive shaft for meshing with the loose pinion, a clutch on the supplemental drive shaft for holding the loose pinion relatively fixed, means for normally holding said clutch in engagement with the loose pinion, and means for automatically throwing said clutch out of engagement with the loose pinion at times.

4. A device of the class described, comprising in combination with a first and second conveyer, a main drive shaft, means for driving said second conveyer from said main drive shaft, a supplemental shaft, means for driving said first conveyer from said supplemental shaft, gear connections between said main drive shaft and said supplemental shaft, said gear connections including a loose pinion on the supplemental drive shaft and a rotatable fixed pinion on the main drive shaft for meshing with the loose pinion, a clutch on the supplemental drive shaft for holding the loose pinion relatively fixed, means for normally holding said clutch in engagement with the loose pinion, means for automatically throwing said clutch out of engagement with the loose pinion at times, said last named means comprising a clutch lever, a bell crank lever coöperating therewith, and means for automatically rocking the said bell crank lever to engage said clutch lever to throw the clutch substantially as shown and described.

5. A device of the class described, comprising in combination with a first and second conveyer, a main drive shaft, means for driving said second conveyer from said main drive shaft, a supplemental shaft, means for driving said first conveyer from said supplemental shaft, gear connections between said main drive shaft and said supplemental shaft, said gear connections including a loose pinion on the supplemental drive shaft and a rotatable fixed pinion on the main drive shaft for meshing with the loose pinion, a clutch on the supplemental drive shaft for holding the loose pinion relatively fixed, means for normally holding said clutch in engagement with the loose pinion, means for automatically throwing said clutch out of engagement with the loose pinion at times, said last named means comprising a clutch lever, a bell crank lever coöperating therewith, means for automatically rocking the said bell crank lever to engage said clutch lever to throw the clutch, said rocking means comprising a pivoted arm, a rod connecting said pivoted arm with said bell crank lever, a rotatable conveying drum carried by said pivoted arm, means for rotating said conveying drum from the main drive shaft.

6. A device of the class described, comprising in combination with a first and second conveyer, a main drive shaft, means for driving said second conveyer from said main drive shaft, a supplemental shaft, means for driving said first conveyer from said supplemental shaft, gear connections between said main drive shaft and said supplemental shaft, said gear connections including a loose pinion on the supplemental drive shaft and a rotatable fixed pinion on the main drive shaft for meshing with the loose pinion, a clutch on the supplemental drive shaft for holding the loose pinion relatively fixed, means for normally holding said clutch in engagement with the loose pinion, means for automatically throwing said clutch out of engagement with the loose pinion at times, said last named means comprising a clutch lever, a bell crank lever coöperating therewith, means for automatically rocking the said bell crank lever to engage said clutch lever to throw the clutch, said rocking means comprising a pivoted arm, a rod connecting said pivoted arm with said bell crank lever, a rotatable conveying drum carried by said pivoted arm, means for rotating said conveying drum from a main drive shaft, and means for adjusting said connecting rod, substantially as shown and described.

GEORGE O. APPEL.

Witnesses:
HENRY ORTH,
WM. VOLKLAND.